(12) United States Patent
Yoon et al.

(10) Patent No.: US 8,458,735 B2
(45) Date of Patent: Jun. 4, 2013

(54) INTEGRATED DISK DRIVING MODULE (75) Inventors: Hoeop Yoon, Seoul (KR); Sejong Kim, Seoul (KR); Jeongho Lee, Seoul (KR); Seongmo Lem, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 253 days.

(21) Appl. No.: 13/073,366

(22) Filed: Mar. 28, 2011

(65) Prior Publication Data
US 2011/0239239 A1 Sep. 29, 2011

(30) Foreign Application Priority Data

Mar. 29, 2010 (KR) ......................... 10-2010-0027876
Apr. 5, 2010 (KR) ......................... 10-2010-0031053

(51) Int. Cl.
*G11B 19/20* (2006.01)
(52) U.S. Cl.
USPC ............................................. 720/696
(58) Field of Classification Search
USPC ............................ 720/661, 695, 696, 697, 703
See application file for complete search history.

(56) References Cited

U.S. PATENT DOCUMENTS

| 6,341,115 | B1 * | 1/2002 | Otani et al. | 720/653 |
| 7,703,110 | B2 * | 4/2010 | Murakami et al. | 720/653 |
| 8,321,883 | B2 * | 11/2012 | Smirnov et al. | 720/696 |
| 2009/0025021 | A1 * | 1/2009 | Iguchi et al. | 720/674 |
| 2010/0319012 | A1 * | 12/2010 | Yoo et al. | 720/695 |
| 2011/0197212 | A1 * | 8/2011 | Yoo et al. | 720/703 |

* cited by examiner

*Primary Examiner* — Angel Castro
(74) *Attorney, Agent, or Firm* — Saliwanchik, Lloyd & Eisenschenk (57) ABSTRACT

An integrated disk driving module is disclosed, the module including a base unit including an opening-formed upper plate, a lateral surface plate bent from an edge of the upper plate to form an accommodation space, and a first motor fixture concavely formed from the upper plate to the accommodation space, and a second motor fixture bent from the upper plate to the accommodation space, wherein the first and second motor fixtures are integrally formed to the upper plate; a spindle motor fixed inside the first motor fixture to rotate a disk; a stepping motor rotatably fixed to the second motor fixture; a circuit substrate arranged at the base unit to be electrically connected to the spindle motor and the stepping motor, and encoder module including an encoder base coupled to an encoder opening formed at the upper plate of the base unit, an encoder coupled to a through hole of the encoder base to sense revolution of the disk, and an encoder circuit substrate electrically connected to the encoder and coupled to the encoder base; and a connector including at least one conductor for electrically connecting the circuit substrate and the encoder circuit substrate, and an insulation member securing the conductor.

25 Claims, 9 Drawing Sheets

INTEGRATED DISK DRIVING MODULE

CROSS-REFERENCE TO RELATED APPLICATIONS

This application claims the benefit under 35 U.S.C. §119 of Korean Application Nos. 10-2010-0027876, filed Mar. 29, 2010 and 10-2010-0031053, filed Apr. 5, 2010, which are hereby incorporated by reference in their entirety.

BACKGROUND OF THE DISCLOSURE

1. Field of the Invention

The present disclosure relates to an integrated disk driving module.

2. Description of Related Art

In general, an ODD (Optical Disk Driver) stores huge data on a disk, and reads the data stored in the disk.

The ODD largely includes a base body, a spindle motor coupled to the base body via a coupling screw, a stepping motor coupled to the base body via a coupling screw, and an optical pickup module storing data on a disk or reading the data from the disk.

The spindle motor is coupled to the base body via a mounting plate, and rotates an optical disk for storing data or an optical disk stored with data at a high speed.

The stepping motor is coupled to the base body via a mounting plate, and feeds the optical pickup module to a radial direction of the optical disk.

The optical pickup module is coupled to a guide shaft coupled to the base body via a coupling screw and slides along the guide shaft by rotation of a lead screw of the stepping motor. The optical pickup module slides along the guide shaft to store data on the optical disk and reads the data stored in the optical disk.

A spindle motor and a stepping motor of an optical disk apparatus according to prior art are coupled to a base body via a mounting plate and a coupling screw, and have a disadvantage of increasing the number of parts that comprise the optical disk apparatus.

The conventional optical disk apparatus is also disadvantageous in that the number of parts increases to take many hours for assembly.

The conventional optical disk apparatus is further disadvantageous in that product accuracy decreases due to manufacturing tolerances of a mounting plate between base body and spindle motor, and manufacturing tolerances of the base body and the spindle motor.

The conventional optical disk apparatus is still further disadvantageous in that the stepping motor and the spindle motor are coupled to the base body via a coupling screw to result in frequent poor assembly in which the spindle motor is not mounted at a designated position, and a lead screw of stepping motor and a guide shaft of optical pickup module are not arranged in parallel.

The conventional optical disk apparatus is still further disadvantageous in that there is a need of a mounting plate for coupling the spindle motor to the base body, and a mounting plate for coupling the stepping motor to the base body, whereby size and weight of the optical disk apparatus greatly increase to be prone to external shock.

The conventional optical disk apparatus disadvantageously includes a light scribe module for generating an image on a disk and an encoder module for detecting revolution of a low speed-rotating disk when the image is generated on the disk, such that it is difficult to accurately arrange the encoder module on a designated position, resulting in frequent poor assembly during assembly of encoder module and increase in assembly time.

The conventional optical disk apparatus is still further disadvantageous in that it is difficult to electrically connect a circuit substrate of an encoder module included in the conventional optical disk apparatus to a circuit substrate for controlling a spindle motor and a stepping motor, resulting in increase in the number of assembly processes and assembly time.

BRIEF SUMMARY

The present disclosure is to provide an integrated disk driving module configured to reduce the number of parts, to reduce assembly time as a result of reduced number of parts, to improve product performance as a result of reduced assembly tolerances, to inhibit incomplete assembly by arranging the spindle motor and the stepping motor at a designated position and to reduce size and weight, by integrally forming a spindle motor and a stepping motor to a base unit and by precisely and easily arranging an light scribe encoder module for detecting revolution of a disk, and to provide a circuit substrate for light scribe encoder module.

The present disclosure is to provide an integrated disk driving module suitable for electrically connecting a circuit substrate controlling a spindle motor and stepping motor by way of a simple process.

Technical problems to be solved by the present disclosure are not restricted to the above-mentioned, and any other technical problems not mentioned so far will be clearly appreciated from the following description by those skilled in the art.

An object of the present disclosure is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present disclosure, there is provided an integrated disk driving module, the module comprising: a base unit including an opening-formed upper plate, a lateral surface plate bent from an edge of the upper plate to form an accommodation space, and a first motor fixture concavely formed from the upper plate to the accommodation space, and a second motor fixture bent from the upper plate to the accommodation space, wherein the first and second motor fixtures are integrally formed to the upper plate; a spindle motor fixed inside the first motor fixture to rotate a disk; a stepping motor rotatably fixed to the second motor fixture; and encoder module including an encoder base coupled to an encoder opening formed at the upper plate near to the spindle motor, an encoder coupled to a through hole of the encoder base corresponding to the encoder opening to sense revolution of the disk, and an encoder circuit substrate electrically connected to the encoder and coupled to the encoder base.

In another general aspect of the present disclosure, there is provided an integrated disk driving module, the module comprising: a base unit including an opening-formed upper plate, a lateral surface plate bent from an edge of the upper plate to form an accommodation space, and a first motor fixture concavely formed from the upper plate to the accommodation space, and a second motor fixture bent from the upper plate to the accommodation space, wherein the first and second motor fixtures are integrally formed to the upper plate; a spindle motor fixed inside the first motor fixture to rotate a disk; a stepping motor rotatably fixed to the second motor fixture; a circuit substrate arranged at the base unit to be electrically connected to the spindle motor and the stepping motor, and encoder module including an encoder base coupled to an encoder opening formed at the upper plate of the base unit, an encoder coupled to a through hole of the encoder base to sense revolution of the disk, and an encoder circuit substrate electrically connected to the encoder and coupled to the encoder base; and a connector including at least one conductor for electrically connecting the circuit substrate and the encoder circuit substrate, and an insulation member securing the conductor.

The integrated disk driving module according to the present disclosure has an advantageous effect in that a first motor fixture for mounting a spindle motor to a base unit and a second motor fixture for mounting a lead screw to a stepping motor are integrally formed, the spindle motor is mounted on the first motor fixture, and the stepping motor is mounted on the second motor fixture, to reduce the number of parts, to reduce assembly time as a result of reduced number of parts and to improve product performance as a result of reduced assembly tolerances.

The integrated disk driving module according to the present disclosure has another advantageous effect in that a light scribe encoder module is mounted at a precise designated position to inhibit incomplete assembly and to reduce assembly time and to easily and electrically connect a circuit substrate for light scribe encoder module to a circuit substrate for controlling a spindle motor and a stepping motor.

DETAILED DESCRIPTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-10 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Figure 1:
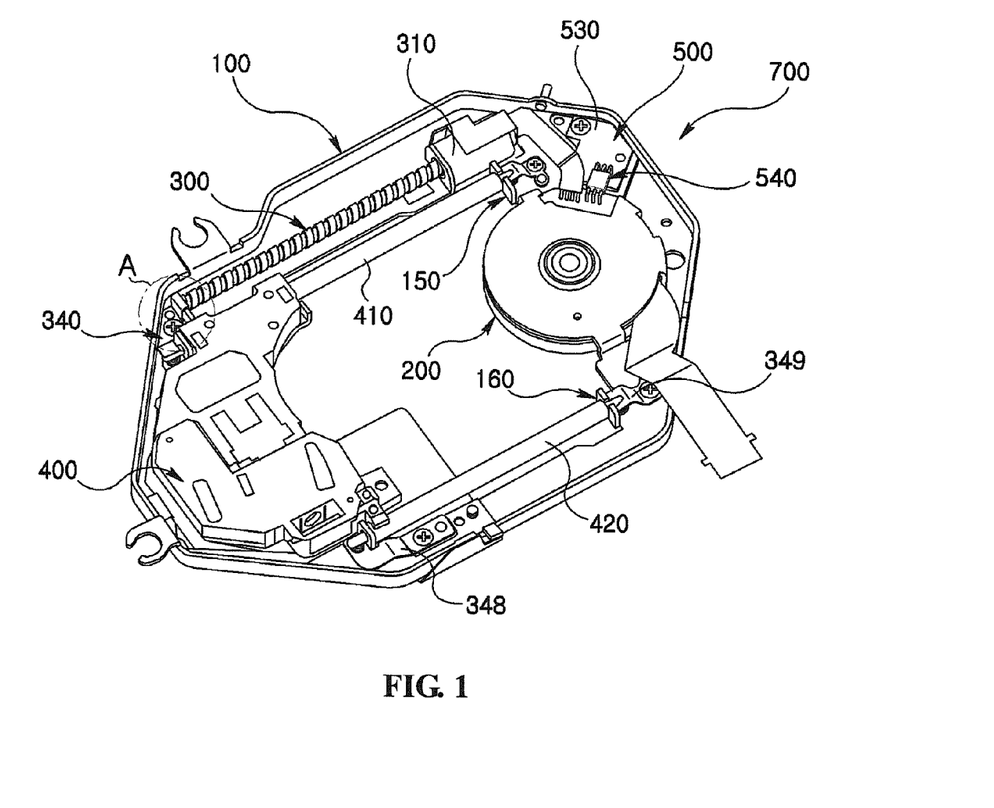
FIG. 1 is a rear perspective view of an integrated disk driving module according to a first exemplary embodiment of the present invention.
Figure 2:
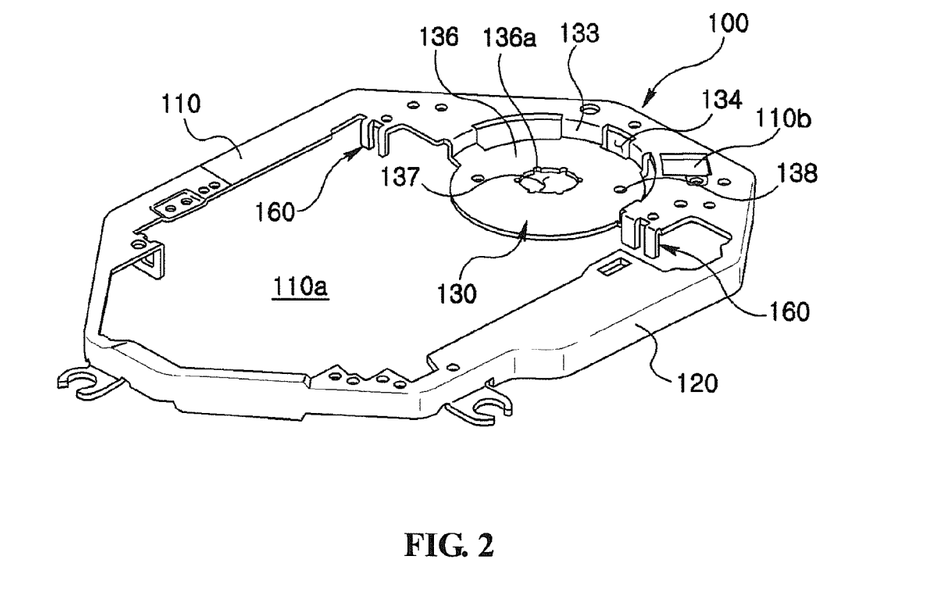
FIG. 2 is a front perspective view of a base unit of FIG. 1.
Figure 3:
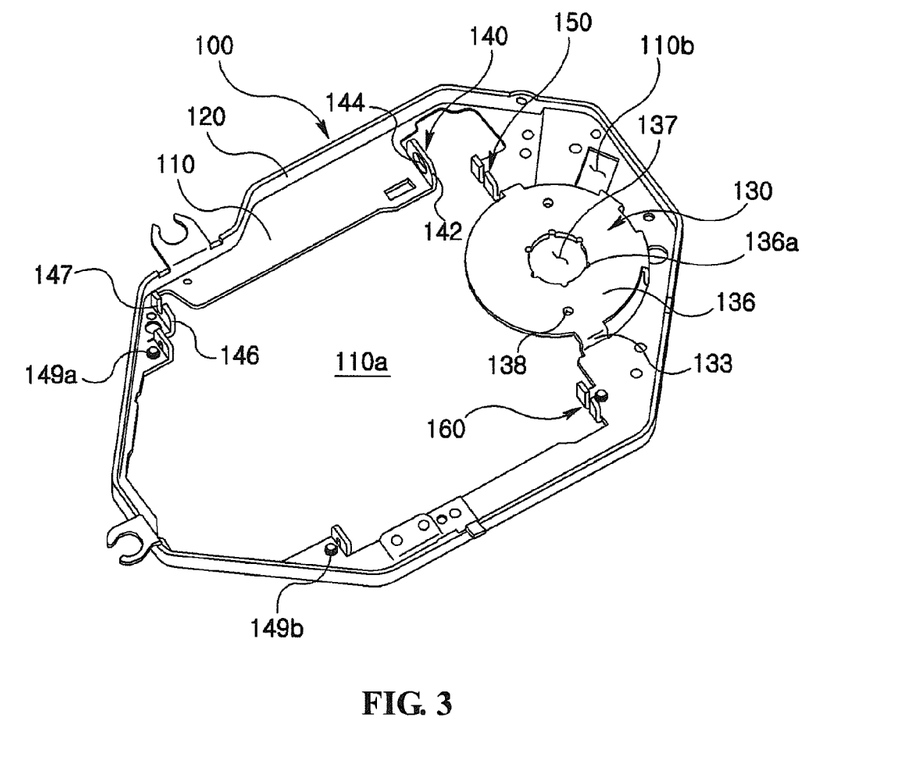
FIG. 3 is a rear perspective view of a base unit of FIG. 1.

FIG. 1 is a rear perspective view of an integrated disk driving module according to an exemplary embodiment of the present invention, FIG. 2 is a front perspective view of a base unit of FIG. 1, and FIG. 3 is a rear perspective view of a base unit of FIG. 1.

Referring to FIG. 1, an integrated disk driving module (700) includes a base unit (100), a spindle motor (200), a stepping motor (300) and a light scribe encoder module (500). The integrated disk driving module (700) may further include a first guide shaft (410), a second guide shaft (420) and an optical pickup module (400).

Referring to FIGS. 2 and 3, the base unit (100) includes an upper plate (110), a lateral surface plate (120), a first motor fixture (130), and a second motor fixture (140). The base unit (100) may further include first and second guide shaft fixtures (150, 160).

The upper plate (110) includes a metal plate, and is centrally formed with an opening (110a).

The upper plate (110) includes a metal plate and is centrally formed with an opening (110a). In the present exemplary embodiment, the upper plate (110) further includes an encoder opening (110b) for exposing an encoder (520) of the light scribe encoder module (500, described later), in addition to the opening (110a).

The upper plate (110) formed with the opening (110a) may take the shape of an octagonal plate when viewed from a plane. Although the present exemplary embodiment of the present disclosure describes the upper plate (110) shaped of an octagonal plate, the upper plate (110) may take various shapes based on arrangement and shapes of the spindle motor (200, described later), the stepping motor (300, described later) and the optical pickup module (400, described later).

A lateral surface plate (120) is bent from an edge of the upper plate (110) to one direction of the upper plate (110), and an accommodation space is formed at the base unit (100) by the upper plate (110) and the lateral surface plate (120) bent from the upper plate (100). In the present exemplary embodiment, the lateral surface plate (120) and the upper plate (110) may be formed in parallel, for example.

The first motor fixture (130) is formed in the shape of a recess from the upper plate (110) toward the accommodation space, and in the present exemplary embodiment, the first motor fixture (130) is integrally formed with the upper plate (110). The first motor fixture (130) may be formed by a press process.

The recess-shaped first motor fixture (130) includes a lateral wall unit (133) and a floor unit (136), where the lateral wall unit (133) and the floor unit (136) are integrally formed with the upper plate (110).

The lateral wall unit (133) is bent from the upper plate (110) to a same direction as the bent direction of the lateral surface plate (120), and may be aligned in parallel with the lateral surface plate (120). That is, the lateral wall unit (133) may be perpendicularly aligned relative to the upper plate (110), for example.

The lateral wall unit (133) bent from the upper plate (110) is formed with at least one opening (134), where three openings (134) may be formed at the lateral wall unit (133). Each of the three openings (134) formed at the lateral wall unit (133) may be formed in a same size or in a different size.

A circuit substrate (180, described later) electrically connected to the spindle motor (200, described later) and the spindle motor (300, described later) passes the opening (134) formed at the lateral wall unit (133), whereby the integrated driving module (700) can have a lighter weight by the openings (134) formed at the lateral wall unit (133).

The floor unit (136) is integrally formed with the lateral wall unit (133), and may be aligned in parallel with the upper plate (110), for example. In the present exemplary embodiment, the floor unit (136) takes the same shape as that of the spindle motor (200, described later). For example, the floor unit (136) may take the shape of a disk when viewed on a plane.

Although the present exemplary embodiment describes and illustrates the disk-shaped floor unit (136), the floor unit (136) may alternatively take various other shapes, in addition to the disk shape.

A center of the floor unit (136) is formed with a circle-shaped through hole (137), when viewed from a plane, in which (137) a bearing housing (139, see FIG. 4a) for securing the spindle motor (200, described later) to the floor unit (136) and securing a bearing and a rotation shaft of the spindle motor (200, described later) is coupled.

Referring to FIG. 3, an inner lateral surface of the floor unit (136) formed by the through hole (137) formed at the center of the floor unit (136) is formed with an internal rotation prevention groove (136a) concavely formed from the inner lateral surface to inhibit the bearing housing (139) of the spindle motor (200) from rotating relative to the floor unit (136).

At least one alignment hole (138) is formed about the through hole (137) formed at the center of the floor unit (136). The alignment hole (138) functions to align a circuit substrate (180, described later) interposed between the floor unit (136) and the spindle motor (200) on a designated position of the floor unit (136). The alignment hole (138) penetrates an upper surface on which the spindle motor (200) is disposed and a bottom surface facing the upper surface on the floor unit (136).

Referring to FIG. 3 again, the second motor fixture (140) is formed at one side of the first motor fixture (130), and functions to secure the stepping motor (300, described later) at the base unit (100). In the present exemplary embodiment, the second motor fixture (140) is integrally formed with the upper plate (110).

The second motor fixture (140) integrally formed with the upper plate (110) is bent from the upper plate (110) to the accommodation space in a pair, and each of the pair of second motor fixtures (140) faces the other in the accommodation space.

Hereinafter, the mutually facing pair of second motor fixtures (140) is defined as a first fixture (142) and a second fixture (146). The first fixture (142) and the second fixture (146) are perpendicularly arranged in parallel relative to the upper plate (110). The first fixture (142) may be bent from the upper plate (110) to the accommodation space, and the second fixture (146) may be perpendicularly formed relative to the upper plate (110), for example.

The first fixture (142) bent from the upper plate (110) is centrally formed with a through hole (144) of a circle shape, for example, Alternatively, the through hole (144) formed on the first motor fixture (142) may take the shape of an oblong or a slit, in addition to the circle shape.

The through hole (144) of the first fixture (142) is passed by a lead screw which is a part of the stepping motor (300, described later), whereby one lateral portion of the lead screw can be rotatably supported by the first fixture (142).

The second fixture (146) facing the first fixture (142) is bent from the upper plate (110) to the accommodation space. The second fixture (146) may be perpendicularly formed relative to the upper plate (110), for example.

An upper surface of the second fixture (146) bent from the upper plate (110) is formed with an insertion groove (147) concavely formed from an upper surface of the second fixture (146) to a bottom surface facing the upper surface of the second fixture (146). The insertion groove (147) formed at the second fixture (146) rotatably supports the other lateral portion facing the one lateral portion of the lead screw which is part of the stepping motor (300, described later).

Although the present exemplary embodiment describes and explains that the through hole (144) is formed at the first fixture (142) and the insertion groove (147) is formed at the second fixture (146), alternatively, it should be apparent that the through hole (144) may be formed at the second fixture (146) and the insertion groove (147) may be formed at the first fixture (142). Alternatively, it should be apparent that the first and second fixtures (142, 146) may be formed with through holes. Alternatively, it should be apparent that the first and second fixtures (142, 146) may be formed with insertion grooves.

Furthermore, each of the first and second fixtures (142, 146) in FIG. 3 may be mutually formed opposite to the other.

Referring to FIG. 3 again, the upper plate (110) of the base unit (100) is formed with first and second guide shaft fixtures (150, 160) for securing first and second guide shafts (410, 420, described later), each guide shaft fixture (150, 160) formed in parallel and distanced at a predetermined space apart.

The first guide shaft fixture (150) is integrally formed with the upper plate (110) of the base unit (100) and functions to secure the first guide shaft (410, described later) to the base unit (100).

The first guide shaft fixture (150) is formed on the upper plate (110) in a pair, and the pair of first guide shaft fixtures (150) is bent from the upper plate (110) to the accommodation space. The first guide shaft fixtures (150) are arranged in parallel with the first and second fixtures (142, 146) of the second motor fixture (140).

The first guide shaft fixture (150) arranged near to the first fixture (142) of the second motor fixture (140) is formed with an insertion groove in which a first distal end of the first guide shaft (140, described later) is inserted, and the remaining another first guide shaft fixture (150) arranged near to the second fixture (146) of the second motor fixture (140) is formed with a through hole through which a second distal end facing the first distal end of the first guide shaft (410) passes. In the present exemplary embodiment, the through hole through which the second distal end of the first guide shaft (410) passes may take the shape of an oblong or a slit.

Furthermore, a coupling hole is formed at each position facing the first guide shaft (140) protruded outside of each of the first guide shaft fixtures (150) on the upper plate (110), and each coupling hole is formed with a height adjustment screw (149a). The height adjustment screw (149a) adjusts a height of the first guide shaft (410) relative to the upper plate (110).

The second guide shaft fixture (160) arranged in parallel with the first guide shaft fixture (150) is formed at the upper plate (110) of the base unit (100), and functions to secure a second guide shaft (420, described later and see FIG. 5) to the upper plate (110) of the base unit (100).

The second guide shaft fixture (160) is arranged on the upper plate (110) in a pair, each facing the other, and each of the pair of second guide shaft fixtures (160) is bent from the upper plate (110) toward the accommodation space. The second guide shaft fixture (160) is arranged in parallel with the first and second fixtures (142, 146) of the second motor fixture (140).

One of the pair of second guide shaft fixtures (160) is formed with an insertion groove through which a third distal end of the second guide shaft (420, described later) is inserted. The remaining one of the pair of second guide shaft fixtures (160) is formed with a through hole through which a fourth distal end facing the third distal end of the second guide shaft (420, described later) passes.

In the present exemplary embodiment, the through hole for passing the fourth distal end of the second guide shaft (420) may take the shape of an oblong or a slit.

Coupling holes are formed at positions facing the second guide shaft (420) protruded outside of the second guide shaft fixtures (160) on the upper plate (110) of the base unit (100), where each of the coupling holes is formed with a height adjustment screw (149b). The height adjustment screw (149b) adjusts a height between second guide shaft (420) and the upper surface (110).

Figure 4A:
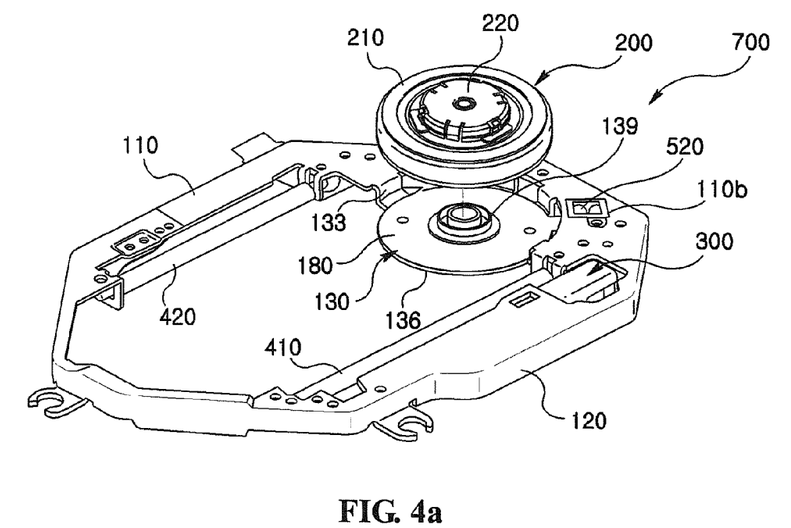
FIG. 4a is an exploded perspective view of a base unit and a spindle motor of FIG. 2.

FIG. 4a is an exploded perspective view of a base unit and a spindle motor of FIG. 2.

Referring to FIGS. 1 and 4a, the spindle motor (200) is arranged inside the first motor fixture (130) concavely formed from the upper plate (110) of the base unit (100).

The spindle motor (200) includes a bearing housing (139), a stator (not shown) secured at the bearing housing (139) and a rotor (210) rotating in association with the stator coupled to a rotation shaft (not shown) coupled in turn to the bearing housing (139). The spindle motor (200) may further include a disk fixture device (220) coupled to the rotation shaft for securing a disk.

The bearing housing (139) is coupled to a through hole (137) formed at the floor unit (136) of the first motor fixture (130) bent from the upper plate (110) of the base unit (100). In the present exemplary embodiment, the floor unit (136) of the first motor fixture (130) functions as a mounting plate coupled to the conventional spindle motor via a coupling screw. In the present exemplary embodiment, configuration of the spindle motor (200) is not limited thereto, but may include other various constituent elements or may delete some of the above-mentioned configurations.

The disk fixture device (220) is rotated along with a rotation shaft by being coupled to the rotation shaft of the spindle motor (200), and is coupled with an optical disk for storing data or an optical disk for reading the stored data.

The spindle motor (200) is arranged with a thin circuit substrate (180) that is applied with a driving signal. In the present exemplary embodiment, the circuit substrate (180) may be a flexible circuit substrate.

Part of the circuit substrate (180) is interposed between the spindle motor (200) and the floor unit (136) of the first motor fixture (130), and is extracted outside of the first motor fixture (130) through an opening (134) formed at the lateral surface unit (133) of the first motor fixture (130).

Figure 4B:
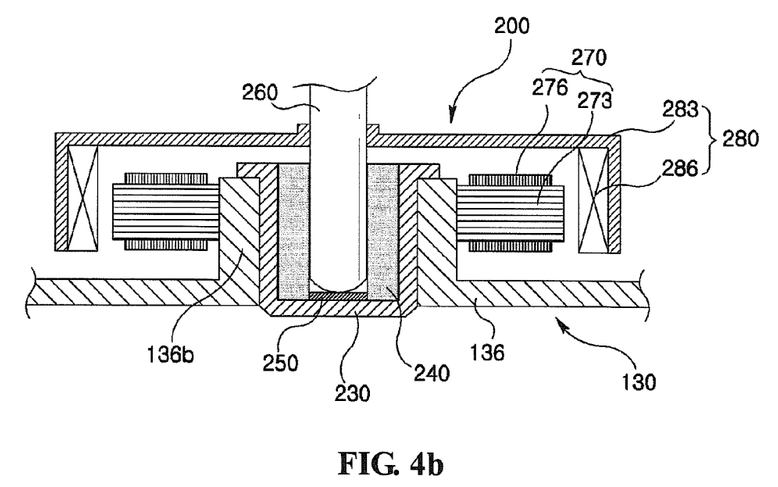
FIG. 4b is a cross-sectional view illustrating a spindle motor of an integrated driving module and a floor unit of a first motor fixture of a base unit according to another exemplary embodiment of the present disclosure.

FIG. 4b is a perspective view illustrating a spindle motor of an integrated driving module and a floor unit of the first motor fixture of a base unit according to another exemplary embodiment of the present disclosure.

Referring to FIG. 4b, the floor unit (136) of the first motor fixture (130) of a base unit (100) according to another exemplary embodiment of the present disclosure is formed with a cylindrical burring unit (136b) protruded toward an upper surface facing a bottom surface from the bottom surface of the floor unit (136).

The burring unit (136b) is formed therein with a bottom-blocked, upper surface-opened, cup-shaped bearing housing (230), and the bearing housing (230) is coupled therein by a cylindrical bearing (240). The bearing (240) coupled to the bearing housing (230) is rotatably coupled by a rotation shaft (260) relative to the bearing (240). Reference numeral 250 is a thrust bearing interposed between the rotation shaft (260) and the bearing housing (230).

The burring unit (136) is formed at a periphery thereof with a stator (270). The stator (270) includes a core (273) formed by stacking a plurality of iron pieces, and a coil (276) wound on the core (273).

The rotation shaft (260) is formed at a periphery thereof with a rotor (280). The rotor (280) includes a yoke (283) and a magnet (286), where the yoke (283) is coupled to the rotation shaft (260), and a part of the yoke (283) facing the core (273) of the stator (270) is formed with the magnet (286). The rotor (280) and the rotation shaft (260) are rotated by a magnetic field generated by the coil (276) wound on the core (273) which is a part of the stator (270) and action of the magnet (286) which is a part of the rotor (280).

Figure 5:
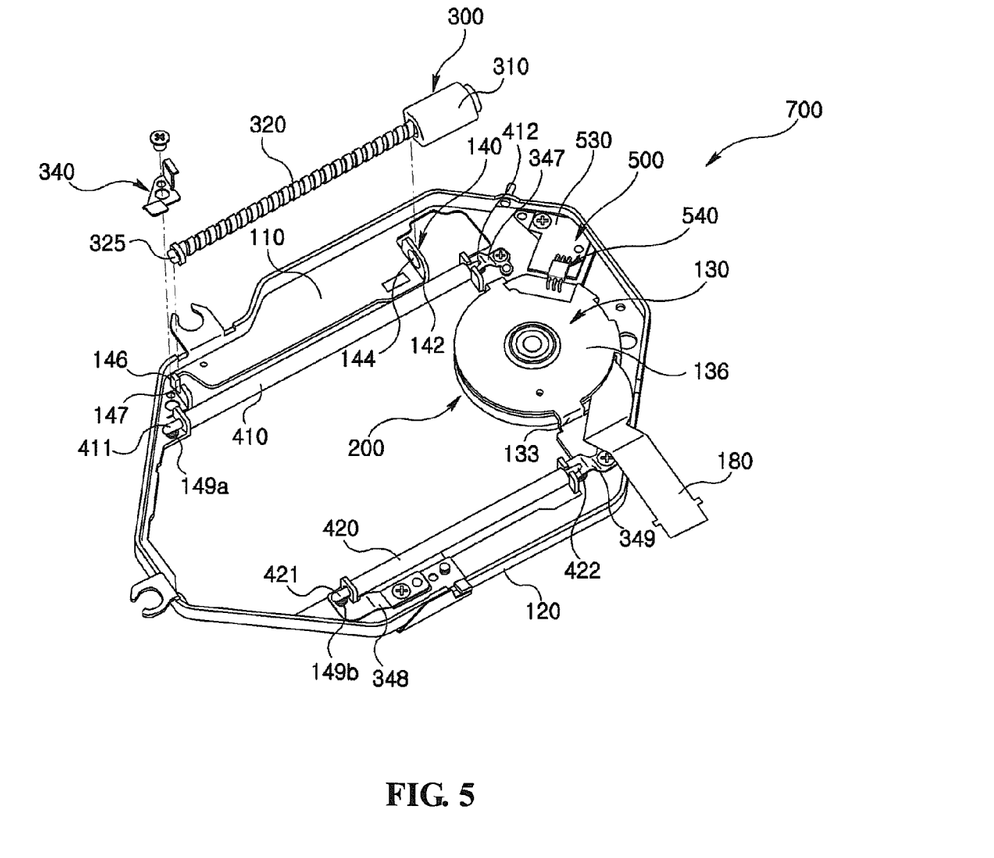
FIG. 5 is an exploded perspective view illustrating a stepping motor coupled to the base unit of FIG. 3.

FIG. 5 is an exploded perspective view illustrating a stepping motor coupled to the base unit of FIG. 3.

Referring to FIGS. 3 and 5, the stepping motor (300) is coupled to the first and second fixtures (142, 146) of the second motor fixture (140) of the base unit (100), where the stepping motor (300) includes a stepping motor body (310), a lead screw (320), and a pivot member (325).

The stepping motor body (310) includes a stator (not shown), and the lead screw (320) is rotated in association with the stator. In the present exemplary embodiment, the stepping motor body (310) and the lead screw (320) may include various configurations, such that the configuration of the stepping motor body (310) is not limited.

The lead screw (320) is formed toward a radial direction of an optical disk secured at the disk fixture device (220) of the spindle motor (200). One lateral portion of the lead screw (320) is rotatably supported by the first fixture (142) via the through hole (144) of the first fixture (142) of the second motor fixture (140), and the other lateral portion facing the one lateral portion of the lead screw (320) is inserted to the insertion groove (147) of the second fixture (146) of the second motor fixture (140) and rotatably supported by the second fixture (146).

The pivot member (325) is coupled to the other portion of the lead screw (320) and is secured at the insertion groove (147) of the second fixture (146) of the second motor fixture (140). The pivot member (325) may include a clip unit that is inserted into the second fixture (146) perpendicularly bent from the upper plate (110) of the base unit (100)

Referring to FIGS. 1 and 5 again, the integrated disk driving module (700) according to an exemplary embodiment of the present disclosure may include an optical pickup module (400).

The optical pickup module (400) reciprocates along a radial direction of the disk by the lead screw (320) of the stepping motor (300) secured to the upper plate (110) of the base unit (100) via a coupling screw, and first and second guide shafts (410, 420) arranged in parallel with the lead screw (320).

The first guide shaft (410) coupled to the optical pickup module (400) is slidably coupled to one side of the optical pickup module (400), and includes a first distal end (411) and a second distal end (412) opposite to the first distal end (411). The first and second distal ends (411, 412) of the first guide shaft (410) are respectively coupled to the pair of first guide shaft fixtures (150).

The second guide shaft (420) is slidably coupled to the other side opposite to the one side of the optical pickup module (400), and includes a third distal end (421) and a fourth distal end (422) opposite to the third distal end (421). The third and fourth distal ends (421, 422) of the second guide shaft (420) are respectively coupled to the pair of second guide shaft fixtures (160).

Referring to FIG. 1 again, the first distal end (411) of the first guide shaft (410) is arranged with a first press member (340) includes a first pressure member (340) to inhibit the first and second distal ends (411, 412) of the first guide shaft (410) from disengaging and a second pressure member (347) is arranged at the second distal end (412).

The third distal end (421) of the second guide shaft (420) is arranged with a third pressure member (348) to inhibit the third and fourth distal ends (421, 422) of the first guide shaft (420) from disengaging, and a fourth pressure member (349) is arranged at the fourth distal end (422).

Each of the first to fourth pressure members (340, 347, 348, 349) takes the shape of a leaf spring, each distal end of one each side of the first to fourth pressure members (340, 347, 348, 349) is secured at the upper plate (110), and each distal end facing the other each side of the first to fourth pressure members (340, 347, 348, 349) applies pressure to the first to fourth distal ends (411, 412, 421, 422).

Figure 6:
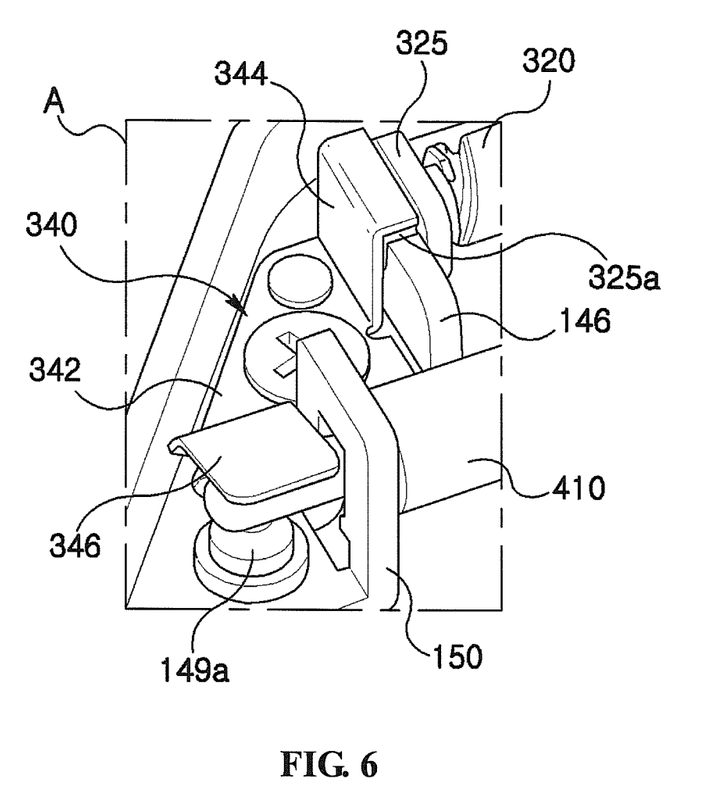
FIG. 6 is a partially enlarged view of 'A' of FIG. 1.

FIG. 6 is a partially enlarged view of 'A' of FIG. 1.

Referring to FIGS. 1 and 6, the pivot member (325) secured at the second fixture (146) of the second motor fixture (140) and the first distal end (411) of the first guide shaft (410) coupled to the first guide shaft fixture (150) are mutually arranged nearby, such that the pivot member (325) and the first distal end (411) can be simultaneously applied with pressure with one single pressure member (340) in the present exemplary embodiment.

To this end, the pressure member (340) may include a body (342), a first pressure unit (344) and a second pressure unit (346) in the present exemplary embodiment.

The body (342) takes the shape of a plate and is secured to the upper plate (110) of the base unit (100) via a coupling screw. The first pressure unit (344) is extended and bent from the body (342) to apply pressure to the pivot member (325), and the second pressure unit (346) is extended and bent from the body (342) to apply pressure to the first distal end (411) of the first guide shaft (410).

Figure 7:
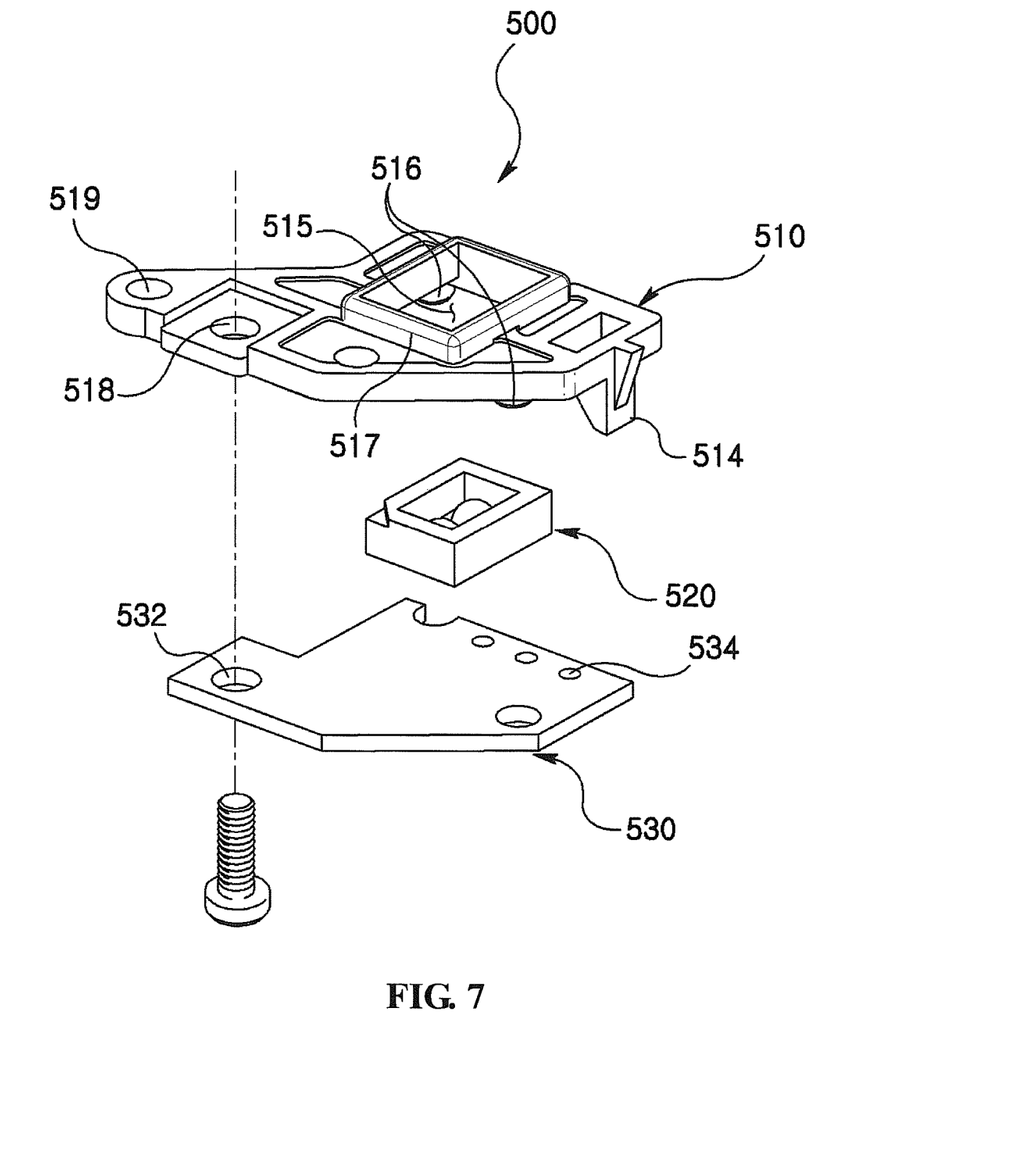
FIG. 7 is an exploded perspective view illustrating a light scribe encoder module according to an exemplary embodiment of the present disclosure.
Figure 8:
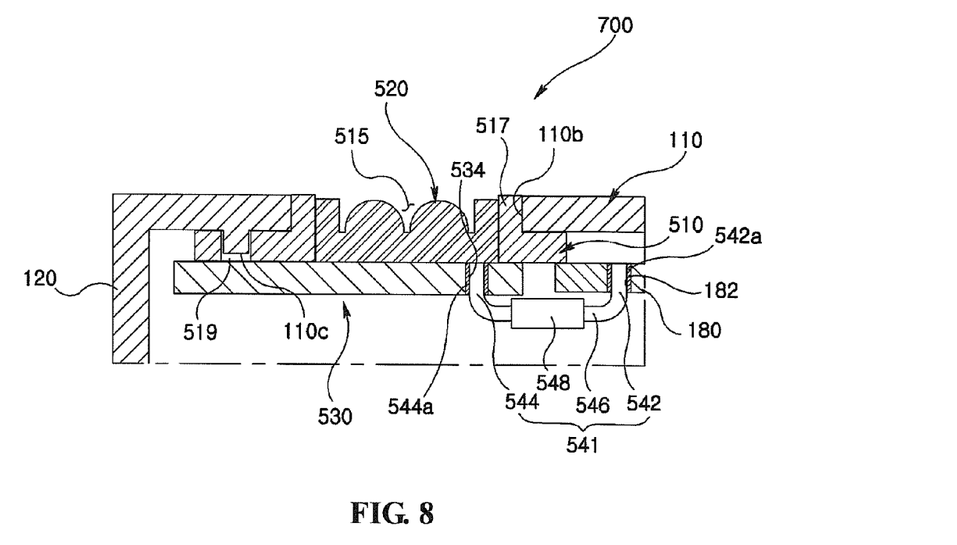
FIG. 8 is a cross-sectional view illustrating the light scribe encoder module of FIG. 7 coupled to an upper plate of a base unit.
Figure 9:
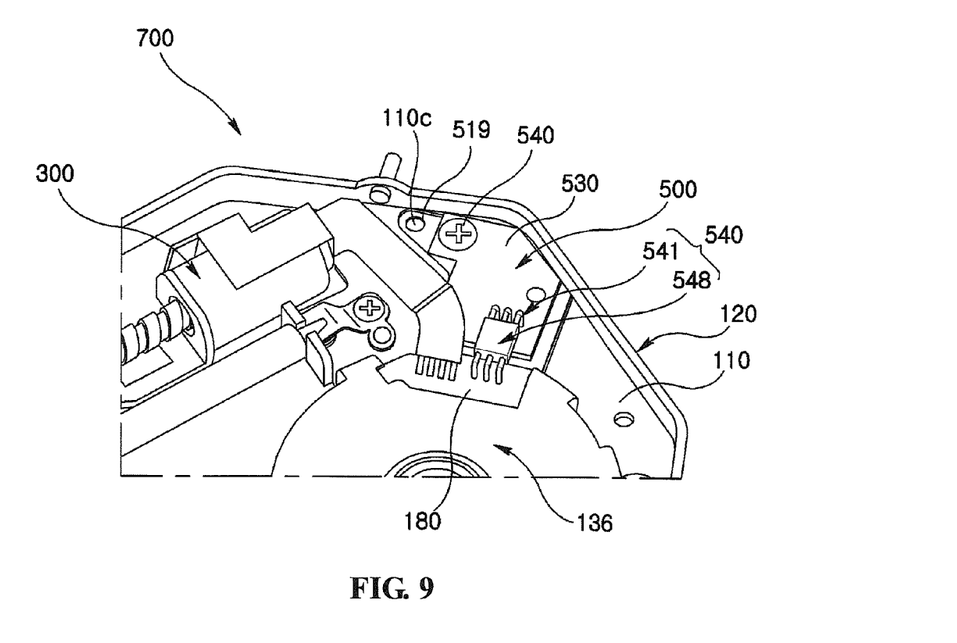
FIG. 9 is a rear perspective view of a base unit coupled with a light scribe encoder module.
Figure 10:
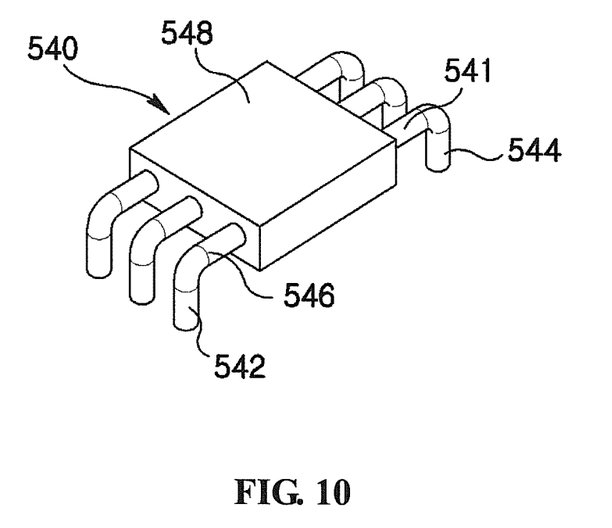
FIG. 10 is a perspective view illustrating a connector connecting the encoder module of FIG. 7, and a spindle motor to a circuit substrate connecting stepping motors.

FIG. 7 is an exploded perspective view illustrating a light scribe encoder module according to an exemplary embodiment of the present disclosure, FIG. 8 is a cross-sectional view illustrating the light scribe encoder module of FIG. 7 coupled to an upper plate of a base unit, FIG. 9 is a rear perspective view of a base unit coupled with a light scribe encoder module, and FIG. 10 is a perspective view illustrating a connector connecting the encoder module of FIG. 7, and a spindle motor to a circuit substrate connecting stepping motors.

Referring to FIGS. 7 through 10, the integrated disk driving module (700) according to the exemplary embodiment of the present disclosure includes a light scribe module (not shown) for forming an image on a surface of a disk so processed to form an image, and a light scribe encoder module (500).

The light scribe module (not shown) forms an image on a surface of the disk, and the light scribe encoder module (500) senses revolution of the disk that is rotated at a low speed by the spindle motor (200) for forming an image on the surface of the disk.

The light scribe encoder module (500) for sensing the revolution of the disk rotated at a low speed by the spindle motor (200) includes an encoder base (510), an encoder (520), an encoder circuit substrate (530) and a connector (540).

The encoder base (510) takes the shape of a plate having an upper surface and a bottom surface facing the upper surface of the encoder base (510). The upper surface of the encoder base (510) is opposite to the upper surface (110) of the base unit (100), and the bottom surface facing the upper surface of the encoder base (510) faces the encoder circuit substrate (530).

The encoder base (510) encompasses the encoder (520), and is formed with a through hole (515) for accommodating the encoder (520). The upper surface of the encoder base (510) is formed with a fixture (517) protruded in the shape of a square frame along a periphery of the through hole (515). The through hole (515) formed at the encoder base (510) is formed at a position corresponding to an encoder opening (110b) formed at the upper surface of the base unit (100), and the encoder opening (110b) is inserted by the fixture (517) of the encoder base (510). The bottom surface of the encoder base (510) is formed with at least two coupling units (516).

The encoder base (510) is formed with at least one coupling hole (518) that passes the upper surface and the bottom surface of the encoder base (510), and at least one alignment hole (519) that passes the upper surface and the bottom surface of the encoder base (510), for example.

The encoder base (510) is laterally formed with a hook (514) for clamping the encoder circuit substrate (530, described later). The hook (514) is hitched by the bottom surface of the encoder circuit substrate (530) to fix the encoder circuit substrate (530) to the encoder base (510).

The encoder (520) takes the shape of thin hexagonal block that is inserted into the through hole (515) of the encoder base (510). The encoder (510) includes a light emitting unit for providing light to the disk and a light receiving unit for collecting light reflected from the disk, and uses the light emitted from the light emitting unit and the light incident from the light receiving unit to sense a revolution of the disk in which the light scribing is performed.

The encoder circuit substrate (530) is coupled to the encoder base (510) and is electrically connected to the encoder (520). The encoder circuit substrate (530) may be further formed with a coupling hole (532) to more stably couple the encoder circuit substrate (530) to the encoder base (510).

The coupling hole (518) of the encoder base (510) and the coupling hole (532) of the encoder circuit substrate (530) are formed on a same position, where the encoder base (510) and the encoder circuit substrate (530) are coupled by a coupling screw (540) as shown in FIG. 9. The coupling screw (540) may be coupled with the upper plate (110) of the base unit (100) together.

The bottom surface of the upper plate (110) of the base unit (100) is formed with an alignment protruder (110c) for securing the encoder base (510) coupled by the encoder (520) and the encoder circuit substrate (530) to a designated position of the upper plate (110) of the base unit (100), and the alignment protruder (110c) formed at the bottom surface of the upper plate (110) is coupled to the alignment hole (519) formed at the encoder base (510), whereby the light scribe encoder module (500) is secured at the upper plate (110) of the base unit (100).

Now, referring to FIGS. 8, 9 and 10, the connector (540) includes a conductor (541) and an insulation member (548).

The connector (540) electrically connects the encoder circuit substrate (530) of the light scribe encoder module (500) to the circuit substrate (180) electrically connected to the spindle and stepping motors (200, 300).

In the present exemplary embodiment, the encoder circuit substrate (530) and/or circuit substrate (180) may be a flexible circuit substrate including a wiring.

The conductor (540) includes a first conduction unit (542), a second conduction unit (544) and a third conduction unit (546).

The first conduction unit (542) is electrically connected to the circuit substrate (180), the second conduction unit (544) is electrically connected to the encoder circuit substrate (530) and the third conduction unit (546) electrically connects the first and second conduction units (542, 544), for example.

In the present exemplary embodiment, the first, second and third conduction units (542, 544, 546) are integrally formed, where the first conduction unit (542) is arranged perpendicular to the circuit substrate (180), and the second conduction unit (544) is arranged perpendicular to the encoder circuit substrate (530).

Each of distal ends of the first and second conduction units (542, 544) takes one of a round shape or a pointed shape, whereby the first and second conduction units (542, 544) can be easily inserted into first and second contact holes (182, 534, described later). The conductor (541) including the first, second and third conduction units (542, 544, 546) may be singly arranged or plurally arranged in parallel.

The insulation member (548) includes an insulation material such as epoxy resin, functions to fix the conductors (541) plurally arranged in parallel to a designated position, and wraps the conductors (541) plurally arranged in parallel.

The conductors (541) fixed by the insulation member (548) may be each distanced apart at a mutually designated space. Alternatively, each conductor (541) fixed by the insulation member (548) may be distanced apart at a mutually different space, as necessary.

The connector (540) including the conductor (541) and the insulation member (548) electrically connects the circuit substrate (180) to the encoder circuit substrate (530).

The circuit substrate (180) is formed with a first contact hole (182) to electrically connect the first conduction unit (542) of the conductor (541) to the circuit substrate (180). The first contact hole (182) is inserted by the first conduction unit (542), whereby the circuit substrate (180) and the first conduction unit (542).

In the present exemplary embodiment, a solder film (542a) may be formed between the first contact hole (182) and the first conduction unit (542). The solder film (542a) may be formed at an inner lateral surface of the circuit substrate (180) or a surface of the first conduction unit (542).

Meanwhile, the encoder circuit substrate (530) is formed with a second contact hole (534) for electrically connecting the second conduction unit (544) of the conductor (541). The second contact hole (534) is inserted by the second conduction unit (544) of the conductor (541), whereby the encoder circuit substrate (530) and the second conduction unit (544) are electrically connected.

In the present exemplary embodiment, a solder film (544a) may be formed between the second contact hole (534) and the second conduction unit (544) of the conductor (541). The solder film (544a) may be formed at an inner lateral surface of the encoder circuit substrate (530) or a surface of the second conduction unit (544).

As apparent from the foregoing, the integrated disk driving module according to the present disclosure has an industrial applicability in that a first motor fixture for mounting a spindle motor to a base unit and a second motor fixture for mounting a lead screw to a stepping motor are integrally formed, the spindle motor is mounted on the first motor fixture, and the stepping motor is mounted on the second motor fixture, to reduce the number of parts, to reduce assembly time as a result of reduced number of parts and to improve product performance as a result of reduced assembly tolerances.

The integrated disk driving module according to the present disclosure has another industrial applicability in that the spindle motor and the stepping motor are arranged at designated positions to inhibit incomplete assembly and to reduce weight and size. The integrated disk driving module according to the present disclosure has still another industrial applicability in that a light scribe encoder module is mounted at a precise designated position to inhibit incomplete assembly and to reduce assembly time and to easily and electrically connect an encoder circuit substrate of encoder module to a circuit substrate.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. An integrated disk driving module, the module comprising: a base unit including an opening-formed upper plate, a lateral surface plate bent from an edge of the upper plate to form an accommodation space, and a first motor fixture concavely formed from the upper plate to the accommodation space, and a second motor fixture bent from the upper plate to the accommodation space, wherein the first and second motor fixtures are integrally formed to the upper plate; a spindle motor fixed inside the first motor fixture to rotate a disk; a stepping motor rotatably fixed to the second motor fixture; and encoder module including an encoder base coupled to an encoder opening formed at the upper plate near to the spindle motor, an encoder coupled to a through hole of the encoder base corresponding to the encoder opening to sense revolution of the disk, and an encoder circuit substrate electrically connected to the encoder and coupled to the encoder base.

2. The integrated disk driving module of claim 1, wherein the first motor fixture integrally formed with the upper plate includes a lateral wall unit bent from the upper plate in a same direction as that of the lateral surface plate, and a floor unit connected to the lateral wall unit.

3. The integrated disk driving module of claim 2, further including a circuit substrate interposed between the spindle motor and the floor unit to be electrically connected to the spindle motor, wherein the lateral wall unit is formed with at least one opening through which part of the circuit substrate passes.

4. The integrated disk driving module of claim 3, wherein the floor unit is formed with at least one floor unit-penetrating circuit substrate alignment hole for aligning the circuit substrate on a designated position of the floor unit.

5. The integrated disk driving module of claim 2, wherein the floor unit of the upper plate takes the corresponding shape as that of the spindle motor when viewed from a plane.

6. The integrated disk driving module of claim 2, wherein a center of the floor unit of the upper plate is formed with a through hole, and a bearing housing of the spindle motor is coupled to the through hole of the floor unit by caulking.

7. The integrated disk driving module of claim 6, wherein an inner lateral surface of the floor unit formed by the through hole formed at the center of the floor unit is formed with an internal rotation prevention groove concavely formed from the inner lateral surface to prevent the spindle motor from rotating relative to the floor unit.

8. The integrated disk driving module of claim 2, wherein the center of the floor unit is formed with a burring unit protruded from a bottom surface of the floor unit toward an upper surface facing the bottom surface, wherein the spindle motor includes a cup-shaped bearing housing coupled to the burring unit, a bearing coupled to an inner side of the bearing housing, a rotation shaft rotatably coupled to the bearing, a stator coupled to the bearing housing and a rotor coupled to the rotation shaft to interact with the stator.

9. The integrated disk driving module of claim 1, wherein a pair of second motor fixtures bent from the upper plate include a first fixture rotatably supporting one lateral portion of the lead screw of the stepping motor, and a second fixture rotatably supporting the other lateral portion facing the one lateral portion of the lead screw.

10. The integrated disk driving module of claim 9, wherein the first fixture is formed with a through hole through which the one lateral portion of the lead screw, and the second fixture includes an insertion groove into which a periphery of the other lateral portion of the lead screw is inserted.

11. The integrated disk driving module of claim 1, further including an optical pickup module that is fed by the stepping motor along a radial direction of the disk.

12. The integrated disk driving module of claim 1, wherein the encoder base is such that a bottom surface of the encoder base formed with a through hole accommodating the encoder and facing the encoder circuit substrate is formed with at least two coupling units protruded from the bottom surface of the encoder base, and the encoder circuit substrate is formed with coupling grooves formed at positions corresponding to those of the protruders.

13. The integrated disk driving module of claim 1, wherein the encoder base includes a hook for clamping the encoder circuit substrate.

14. The integrated disk driving module of claim 1, wherein an upper surface facing the upper plate in the encoder base is formed with at least one alignment groove, and the upper plate is formed with an alignment protrude coupled to the alignment groove formed at the upper plate of the encoder base.

15. The integrated disk driving module of claim 1, wherein the encoder base is formed with a coupling hole, the upper plate corresponding to the coupling hole of the encoder base is formed with a coupling hole, wherein the upper plate and the encoder base are coupled by a coupling screw passing the coupling holes.

16. The integrated disk driving module of claim 3, wherein the circuit substrate and the encoder circuit substrate are electrically connected by a connection substrate.

17. The integrated disk driving module of claim 16, wherein the connection substrate is a flexible circuit substrate.

18. An integrated disk driving module, the module comprising: a base unit including an opening-formed upper plate, a lateral surface plate bent from an edge of the upper plate to form an accommodation space, and a first motor fixture concavely formed from the upper plate to the accommodation space, and a second motor fixture bent from the upper plate to the accommodation space, wherein the first and second motor fixtures are integrally formed to the upper plate; a spindle motor fixed inside the first motor fixture to rotate a disk; a stepping motor rotatably fixed to the second motor fixture; a circuit substrate arranged at the base unit to be electrically connected to the spindle motor and the stepping motor, and encoder module including an encoder base coupled to an encoder opening formed at the upper plate of the base unit, an encoder coupled to a through hole of the encoder base to sense revolution of the disk, and an encoder circuit substrate electrically connected to the encoder and coupled to the encoder base; and a connector including at least one conductor for electrically connecting the circuit substrate and the encoder circuit substrate, and an insulation member securing the conductor.

19. The integrated disk driving module of claim 18, wherein the conductor includes a first conduction unit connected to the circuit substrate, a second conduction unit connected to the encoder circuit substrate and a third conduction unit that connects the first and second conduction units.

20. The integrated disk driving module of claim 19, wherein the circuit substrate is formed with a first contact hole coupled to the first conduction unit, and the encoder circuit substrate is formed with a second contact hole coupled to the second conduction unit.

21. The integrated disk driving module of claim 20, wherein at least one inner lateral surface of the circuit substrate and the encoder circuit substrate formed by the first and second contact holes is formed with a solder film.

22. The integrated disk driving module of claim 19, wherein the insulation member wraps the third conduction unit.

23. The integrated disk driving module of claim 19, wherein the conductor includes a solder film arranged on the second and third conduction units.

24. The integrated disk driving module of claim 18, wherein the circuit substrate and the encoder circuit substrate are flexible circuit substrates.

25. The integrated disk driving module of claim 19, wherein each of distal ends of the first and second conduction units takes one of a round shape or a pointed shape.

* * * * *